Frederick R. Averett
INVENTOR.

Aug. 3, 1965  F. R. AVERETT  3,198,540
LEAF HOLDER AND TRANSPORTER
Filed Feb. 19, 1963  2 Sheets-Sheet 2

Frederick R. Averett
INVENTOR.

United States Patent Office 3,198,540
Patented Aug. 3, 1965

3,198,540
LEAF HOLDER AND TRANSPORTER
Frederick R. Averett, 719 Lee Ave., Rome, Ga.
Filed Feb. 19, 1963, Ser. No. 259,514
3 Claims. (Cl. 280—78)

This invention primarily relates to a device for storing accumulated raked leaves and also includes means to subsequently transport said leaves to a place where they can be disposed of.

It is the object of this invention to provide a leaf holder and transporter which comprises two hinged bins or shells which may be opened to a leaf-receiving position and when filled may be pivoted to form an enclosure whereby said bins or shells may be rolled to a desired place where said leaves may be disposed of.

Another object of this invention in accordance with the preceding object, is to provide a device of the character indicated wherein said hinge means may be removed from said shells so that they may be nested for shipping or storage purposes.

It is still another object of this invention to provide a device of the character indicated having a foraminous surface which may comprise plastic or metallic grid elements or a screen mesh to provide ventilation for the interior of the aforementioned enclosure.

Yet another object of this invention is to provide a device of the character indicted wherein latch means are provided for positively securing the bins or shells together when in closed position to enable rotational and linear movement of said enclosure along the ground surface.

A still further object of this invention resides in the provision of a bifurcated member pivotally attached to and straddling said enclosure having a handle actuator to impart the requisite force to cause sustained rotational and linear movement of said enclosure along the ground surface.

Another object of this invention resides in its simplicity of construction and efficiency in use.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
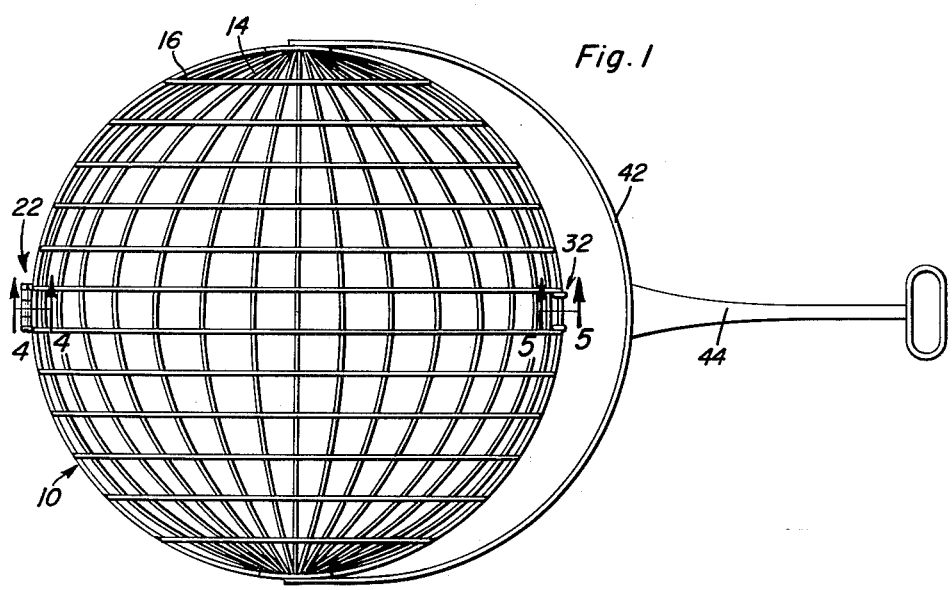
FIGURE 1 is a top plan view of the device comprising the subject matter of the instant invention in closed position.

Referring now to the drawings in detail, the instant invention comprises two shells or bins including an upper shell 10 and a lower shell 12. Although said shells are disclosed as being hemispherical in shape, it should be understood that any shape may be utilized as long as the proper rotational movement can be imparted thereto. As shown, each of the said shells includes a plurality of grids forming a foraminous network of meridians 14 and parallels 16 on said hemispherical shells. It should also be understood that this invention contemplates that said grids may be either wire of any suitable plastic network or may be formed from a mesh-like screen. The meridians and parallels are spaced closely together so that leaves disposed in said shells or bins will not be able to fall through the openings in the foraminous network. Such a network has been conceived in order to provide ventilation for leaves stored within the holder and transporter and prevent the accumulation of noxious odors or the like. It should also be understood that if said foraminous network is formed from heavy gage wire leaves may be burned directly within the transporter.

Figure 2:
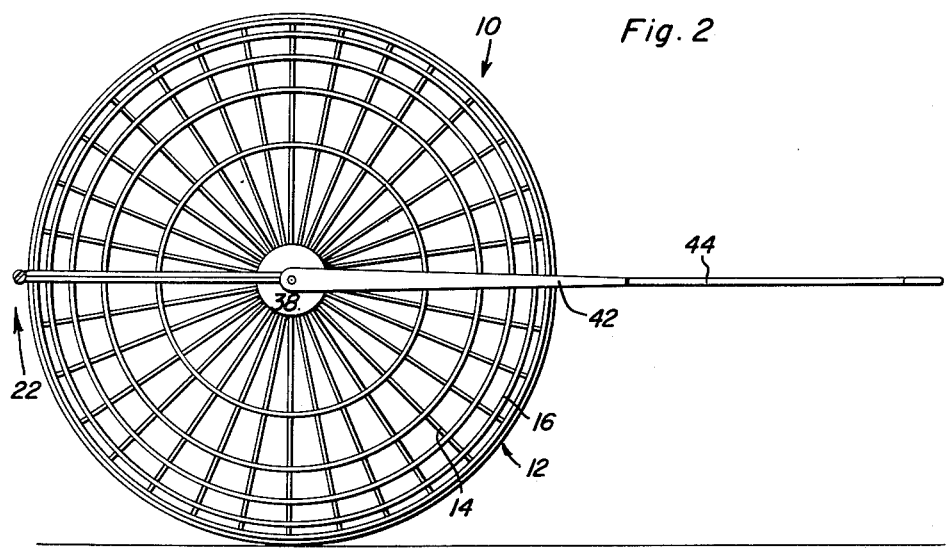
FIGURE 2 is a side elevational view of the device in closed position.

Shell 10 is open at one end to form a leaf-receiving mouth 18 and shell 12 is also open at one end to form a leaf-receiving mouth 20. Said shells are hinged together as shown at 22 to enable the user to pivotally displace one shell with respect to the other in order to form an enclosure such as shown in FIGURES 1 and 2 of the drawings to house the accumulated leaves. Said hinge means 22 is of the type which includes a pair of spaced tubular ears 24 and 26 secured to the hemispherical shell 12 along the rim thereof and is adapted to mate with and surround a tubular projection 28 welded to the hemispherical shell 10. A suitable hinge pin comprising a bolt 30 having an enlarged head and threaded at one end is slidably received through the tubular ears or projections 24, 26 and 28 and a nut is removably placed in the shank of said bolt at the remote end from said enlarged head to formulate the requisite pivotal attachment. The hinge pin has been rendered removable for a definite purpose. With the hinge pin removed, the hemispherical shells may be nested either for convenient storing or shipping purposes.

Suitable resilient latch means such as indicated at 32 are pivotally attached to the rim of the hemispherical shell 10 to secure said shells together when they form an enclosure. Said latch means includes a pair of eyes 34 suitably mounted on the rim of the hemispherical shell 10 and terminate in an arcuate shaped hook member 36 which is adapted to snap under the rim of the other hemispherical shell 12 to secure the two shells together.

As shown in the drawings the meridians 14 of the grid of the hemispherical shells terminate in a pair of semi-circular end plates 38 and 40. The end plates 38 and 40 on the hemispherical shell 12 pivotally mount by any suitable means a bifurcated strap member 42 which straddles said shell and the entire enclosure when formed. An elongated actuating handle 44 is centrall disposed upon said pivoted bifurcated member 42 for imparting the requisite pivotal movement to the spherical enclosure for transporting the leaves.

Figure 3:
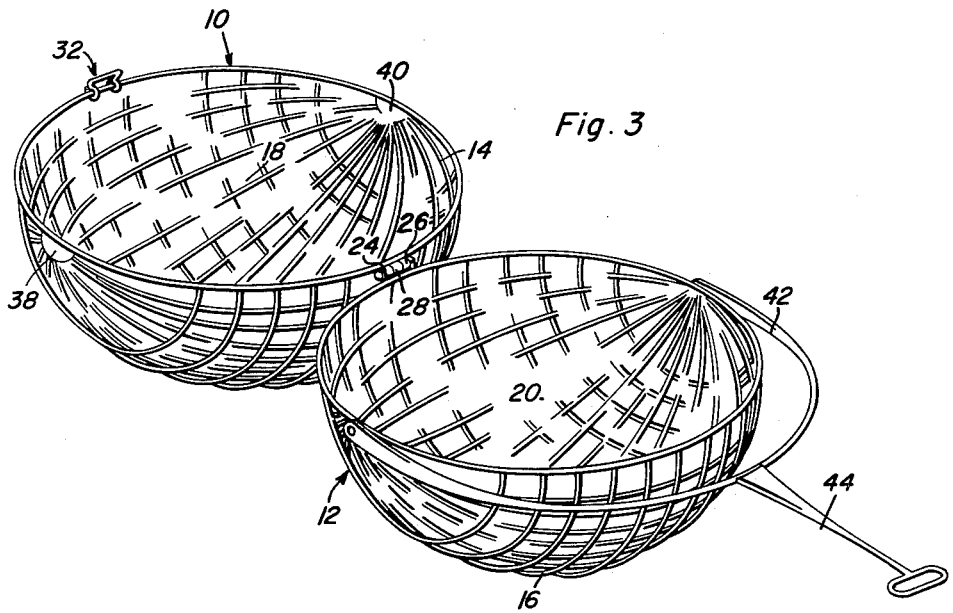
FIGURE 3 is a perspective view of the device in open position ready to receive leaves to be stored therein.
Figure 4:
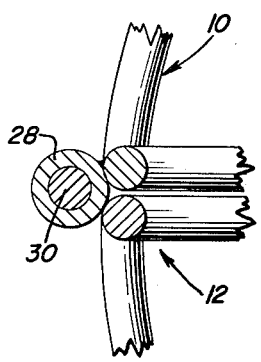
FIGURE 4 is a fragmentary sectional view taken substantially along line 4—4 of FIGURE 1 and illustrating the hinge means of the instant invention.
Figure 5:
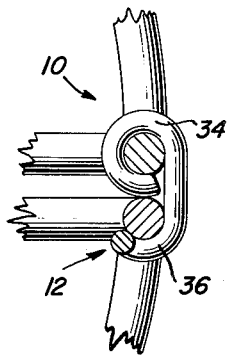
FIGURE 5 is a fragmentary sectional view taken substantially along line 5—5 of FIGURE 1 and illustrating the latch means of the instant invention.

The operation of the device should now be readily apparent. The device is opened whereupon the two shells may be engaged on the ground as shown in FIGURE 3 for reception of leaves through the leaf-receiving mouths 18 and 20 respectively. When full, the shell 10 may be pivoted with respect to the shell 12 and the latch means engaged to completely enclose the leaves. Thereupon, the spherical enclosure may be enrolled to a place where the leaves will be disposed by merely pushing said enclosure by means of the handle element 44 and the bifurcated pivoted member 42, which will cause the spherical enclosure to rotate.

It should also be noted that the hemispherical shells may be made of solid materials with a predetermined number of spaced holes to provide for ventilation to the interior of said shells.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A leaf holder and transporter in which raked leaves may be stored and conveyed to a disposal unit comprising a pair of frame means each of which includes a hemispherical shell having a foraminous network opening at one end to define a leaf-receiving mouth, mating hinge means on each of said shells at said one end for permitting relative pivotal displacement of each of said hemispherical shells about the axis of said hinge means to form a spherical enclosure and, alternatively, two leaf receivers, latch means for securing said hemispherical shells together when in closed relationship, and means for imparting and sustaining rotational and linear movement of said spherical enclosure, said network comprising a plurality of closely spaced members disposed as meridians and parallels on said hemispherical shells, said hinge means embodying separable and connectible parts, said hinge means enabling nesting of said hemispherical shells for storing and shipping purposes, said means for imparting to and sustaining rotational and linear movement including an arcuate yoke having a centrally located elongated handle, the free ends of said yoke being pivotally attached to one of said hemispherical shells at diametrically opposite points adjacent said one end.

2. For use when gathering, loading and dumping dead leaves, grass and debris and transporting the same from a place of collection to a place of deposit, a manually maneuverable leaf holder and transporter comprising: a rollable container embodying a first hollow foraminous shell having an open mouth and providing an unobstructed receiver in which leaves can be loaded, packed by hand and confined for transportation, means hingedly joining contiguous components of the respective mouth portions and permitting said shells to reside upon the surface of the ground in coplanar relationship with the mouth portions facing upwardly to facilitate filling both shells to capacity with leaves, said second shell being adapted to be swung toward and atop the first shell, and means separably latching the shells together, whereby the then loaded container can be rolled along the ground or other foundation for subsequent opening of the shells and dumping of the trapped leaves, the mouth portion of each shell embodying a frame member, said frame members being alike in construction and adapted to be superimposed in mating and abutting relationship when the container is closed for transporting purposes, said hinge means being carried in part on the periphery of one frame member and in part on the other frame member, the component parts of said hinge means being separably connectible so that the shells can be parted and nested one within the other for compact and convenient handling and storage, and said latching means being pivotally mounted on one frame member and adapted to be releasably connected to the other frame member, said latching means being located diametrically opposite the hinge means.

3. A leaf holder and transporter in which raked leaves may be stored and conveyed to a disposal unit comprising a pair of frame means each of which includes a hemispherical shell having a foraminous network opening at one end to define a leaf-receiving mouth, mating hinge means on each of said shells at said one end for permitting relative pivotal displacement of each of said hemispherical shells about the axis of said hinge means to form a spherical enclosure and, alternatively, two leaf receivers, latch means for securing said hemispherical shells together when in closed relationship, and means for imparting and sustaining rotational and linear movement of said spherical enclosure, said hinge means embodying separable and connectible parts, said hinge means enabling nesting of said hemispherical shells for storing and shipping purposes, said means for imparting to and sustaining rotational and linear movement including an arcuate yoke having a centrally located elongated handle, the free ends of said yoke being pivotally attached to one of said hemispherical shells at diametrically opposite points adjacent said one end.

References Cited by the Examiner

UNITED STATES PATENTS

| 618,317 | 1/99 | Anderson | 220—19 X |
|---|---|---|---|
| 1,137,698 | 4/15 | Clark | 220—19 |
| 2,548,190 | 4/51 | Arpin | 280—5 |
| 2,575,149 | 11/51 | Watson | 220—5 |
| 3,047,305 | 7/62 | Kleinschmidt | 280—36 |
| 3,083,979 | 4/63 | Boyd | 280—78 |

FOREIGN PATENTS

| 208,367 | 4/40 | Switzerland. |
|---|---|---|
| 6,657,921 | 9/51 | Great Britain. |

A. HARRY LEVY, *Primary Examiner.*